US 6,556,566 B1

United States Patent
Ikeda

(10) Patent No.: US 6,556,566 B1
(45) Date of Patent: Apr. 29, 2003

(54) TIME DIVISION SWITCH WITH INSERTER AND DROPPER USING EXTERNAL MEMORY AND TIME DIVISION SWITCHING METHOD

(75) Inventor: Saburou Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/168,956

(22) Filed: Oct. 9, 1998

(30) Foreign Application Priority Data

Oct. 9, 1997 (JP) .............................................. 9-277560

(51) Int. Cl.[7] .............................. H04J 3/00; H04Q 11/08
(52) U.S. Cl. ....................................... 370/376; 370/378
(58) Field of Search ................................. 370/314, 328, 370/329, 345, 347, 360, 366, 368, 369, 375, 376, 378, 379, 432, 442, 458, 462, 389, 386, 383, 392, 398, 399, 422, 428, 429, 463, 535, 537, 538

(56) References Cited

U.S. PATENT DOCUMENTS

| 4,564,936 A | * | 1/1986 | Takahashi | 370/58 |
| 5,001,706 A | * | 3/1991 | Dighe et al. | 370/422 |
| 5,123,012 A | * | 6/1992 | Suzuki | 370/66 |
| 5,233,603 A | * | 8/1993 | Takeuchi et al. | 370/412 |
| 5,434,857 A | * | 7/1995 | Mori | 370/66 |
| 5,450,401 A | * | 9/1995 | Tatsuki | 370/68 |
| 5,513,134 A | * | 4/1996 | Cooperman et al. | 365/49 |
| 5,555,245 A | * | 9/1996 | Alatalo | 370/66 |
| 5,612,952 A | * | 3/1997 | Motoyama | 370/412 |
| 6,269,097 B1 | * | 7/2001 | Keun et al. | 370/375 |

FOREIGN PATENT DOCUMENTS

| JP | 61-258598 | 11/1986 |
| JP | 62-125751 | 6/1987 |
| JP | 4-46426 | 2/1992 |

* cited by examiner

Primary Examiner—Alpus H. Hsu
Assistant Examiner—Roberta Stevens
(74) Attorney, Agent, or Firm—Foley & Lardner

(57) ABSTRACT

The invention provides a time-division switch and a time-division switching method by which a multi-frame signal of an arbitrary bit length can be outputted to or inputted from an arbitrary time slot. The time-division switching method is applied to weitchably connect time slots between different highways in time-division multiplex communication. The switch includes an external memory to which data from input time slots may be dropped, and from which data may be inserted into output time slots. Fixed data such as tone data may also be inserted into time slots. Dropping and insertion may be performed to replace existing time slot data or to fill new time slots.

10 Claims, 2 Drawing Sheets

TIME DIVISION SWITCH WITH INSERTER AND DROPPER USING EXTERNAL MEMORY AND TIME DIVISION SWITCHING METHOD

BACKGROUND OF THE INVENTION

1. Field of the Invention

The present invention relates to a time-division switch and a time-division switching method for a time-division switch.

2. Description of the Related Art

Conventionally, a time-division switch merely has a basic function to arrange time slots of a data highway inputted thereto arbitrarily on time slots on another highway to be outputted to interconnect different apparatus, which are physically connected to each other outside the time-division switch, with such time slots so that data or an audio signal may be communicated between the different apparatus.

Meanwhile, such functions as sending out a tone signal of a busy-back tone, or the like or sending out or receiving a multi-frame signal must all rely upon externally connected apparatus for exclusive use.

Consequently, it cannot be avoided that the system is discretized and exhibits a large scale.

As described above, a conventional time-division switch requires use of external apparatus for exclusive use for almost all required functions other than the switching function of time slots.

For example, the PIAFS (PHS Internal Access Forum Standard), which is a data transfer protocol of the PHS (Personal Handyphone System), can be compared to a 640-bit multi-frame signal train. If it is tried to use the PIAFS protocol for processing of a plurality of lines, then a time-division switch for line separation for distinguishing an audio signal and data from each other, a function of producing multi-frames of 640 bits specified by the PIAFS and inserting the multi-frames into suitable time slots and another function of dropping a multi-frame signal train and extracting a data train of 640 bits from the multi-frame signal train are required.

More particularly, for communication of an audio signal, only switch connection is required. However, for communication of data, connection to an apparatus for exclusive use is required even for a call of a same time slot as in the case of the data transfer protocol described hereinabove because contents of the signal are different, and the apparatus for exclusive use must have functions different from mere switch connection such as functions of extracting a multi-frame signal train of 640 bits mentioned hereinabove, performing protocol control specified by the PIAFS based on the signal train and securing the normality of the data.

Further, as the number of lines increases, also the numbers of required apparatus for exclusive use increase, which increases the scale of the system.

Furthermore, if also such apparatus as an apparatus for sending out guidance information such as a busy-back tone mentioned hereinabove are included, also the number of types of apparatus for exclusive use increases, and as the number of service functions of the system increases, also the number of apparatus for exclusive use is inclined to increase while they are discretized for different functions.

SUMMARY OF THE INVENTION

It is an object of the present invention to provide a time-division switching method which allows a time-division switch to have several functions which are conventionally achieved by different apparatus for exclusive use.

It is another object of the present invention to provide a time-division switch which achieves several functions which are conventionally achieved by different apparatus for exclusive use.

Where principal basic functions required by such apparatus for exclusive use as described above are examined, it is considered that, for a tone signal, data of a time slot of any highway repetitively appear with a certain periodicity. This also applies to an audio guidance. Meanwhile, in the PIAFS protocol described above, multi-frames of 640 bits repetitively appear. Thus, generally speaking, basic functions of almost all apparatus for exclusive use can be included in signal processing of multi-frames having a certain periodicity.

Taking notice of the foregoing, the present invention provides a method wherein a time-division switch is provided with, in addition to a switching function wherein time slots of an arbitrary highway inputted are transferred and placed into time slots of another arbitrary highway to be outputted, a reading/writing function for an external memory and the external memory is controlled as an imaginary time slot, thereby providing data insertion and data dropping functions. The time-division switch further has a controlling method wherein read and write addresses of the external memory are circulated so that apparatus for exclusive use in the prior art can be replaced with imaginary time slots to realize economization and miniaturization.

In particular, in order to attain the objects described above, according to an aspect of the present invention, there is provided a time-division switching method for switchably connecting time slots between different highways in time-division multiplex communication, comprising the steps of temporarily storing time slots on any of the highways for each time slot, designating time slots on any of the highways and designating phase conversion arrangement, producing an additional new time slot, calculating external memory read address designation bits for reading out data from an external memory from a head address, an end address and an address counter, performing at least one of updating insertion wherein setting data read out in accordance with the external memory read address designation bits is inserted into a pertaining time slot to update the time slot and new insertion wherein the setting data is inserted into the new time slot, and dropping data from the temporarily stored time slots of the highway in accordance with data drop designation bits and storing the dropped data into the external memory in accordance with the external memory storage address designation bits.

According to another aspect of the present invention, there is provided a time-division switch with an inserter and a dropper of an external memory added type for switchably connecting time slots between different highways in time-division multiplex communication, comprising a time slot memory for temporarily storing time slots on any of the highways for each time slot, phase conversion arrangement means for designating time slots on any of the highways and designating phase conversion arrangement, additional time slot production means for producing an additional new time slot, address calculation means for calculating external memory read address designation bits for reading out data from an external memory from a head address, an end address and an address counter, insertion means for performing at least one of updating insertion wherein setting data read out in accordance with the external memory read address designation bits is inserted into a pertaining time slot to update the time slot and new insertion wherein the setting data is inserted into the new time slot, and dropping means for dropping data from the temporarily stored time slots of the highway in accordance with data drop designation bits and storing the dropped data into the external memory in accordance with the external memory storage address designation bits.

In the time-division switching method and the time-division switch, external data read out in accordance with the external memory read address designation bits may be temporarily stored into an external data storage memory.

The time slot to be newly inserted may be a time slot of a multi-frame of a signal train of a number of bits equal to an integral number of times a number of bits which compose a time slot.

The setting data to be inserted may be a tone signal.

With the time-division switching method and the time-division switch, three address factor storage areas for a head address, an end address and an address count are provided for each time slot, and circulating designation of address is possible for each time slot. Consequently, the time-division switch can perform supervision or sending out of a multi-frame signal for all time slots and can also perform an ordinary switching function. Accordingly, not only communication of audio data, but also transfer of data having a nature of a multi-frame signal train as specified in the PIAFS can be performed collectively by a single LSI without using an external apparatus for exclusive use. Consequently, the time-division switch can perform communication of both of data and an audio signal and can be implemented in such a small size and low power consumption that it can be well applied to a system construction for mobile computing and so forth.

The above and other objects, features and advantages of the present invention will become apparent from the following description and the appended claims, taken in conjunction with the accompanying drawings.

DESCRIPTION OF THE PREFERRED EMBODIMENT

Figure 1:
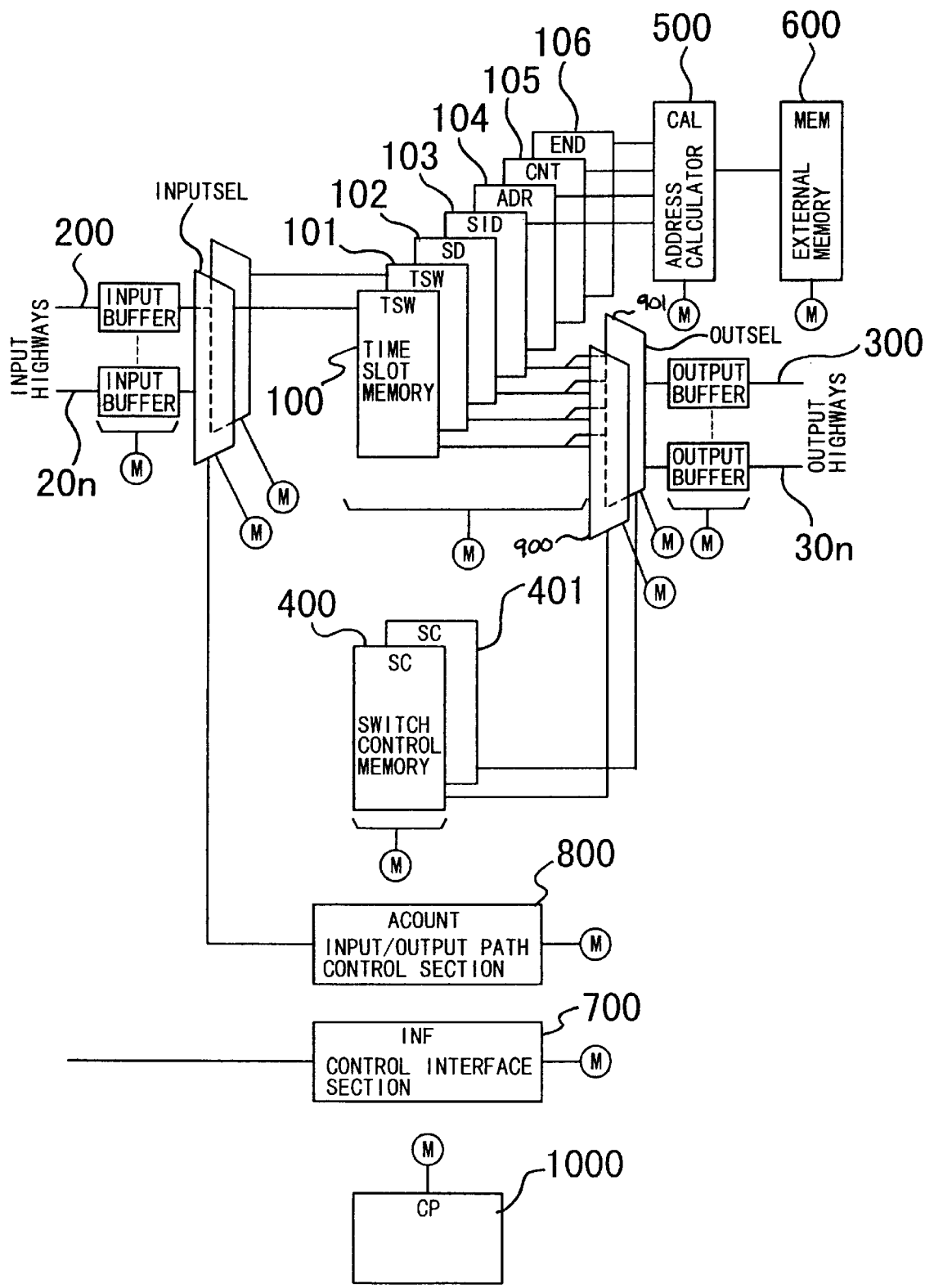
FIG. 1 is a block diagram of a time-division switch with an inserter and a dropper of the external memory added type to which the present invention is applied.

Referring first to FIG. 1, there is shown a time-division switch with an inserter and a dropper of the external memory added type. The time-division switch shown includes time slot memories (TSW) 100 and 101 each for temporarily storing time slots on a highway for each time slot, external data storage memory (SD) 102 for storing data read out from an external memory (MEM) 600, switch control memories (SC0) 400 and 401 for storing designation bits for designating n input highways 200 to 20n and time slots of them and n output highways 300 to 30n and time slots of them, respectively, a setting data memory (SID) 103 for producing fixed data on an arbitrary time slot, a head address memory (ADR) 104, an end address memory (END) 106 and an address counter memory (CNT) 105 for controlling the external memory 600, an address calculator (CAL) 500 for referring to the head address memory (ADR) 104, end address memory (END) 106 and address counter memory (CNT) 105 to calculate an address, a control interface section (INF) 700, and an input/output path control section (ACOUNT) 800.

Each of the switch control memories (SC0) 400 and 401 has a designation bit storage region provided therein so as to allow designation of a time slot of any highway or designation of setting data of the setting data memory (SID) 103, and designation bits are stored into the designation bit storage regions of the switch control memories (SC0) 400 and 401, thereby providing a data insertion function to the time-division switch.

The setting data memory (SID) 103 not only allows setting of arbitrary data but also has provided therein a designation bit storage region for designating a storage destination of drop data from a slot of an arbitrary highway, and designation bits are stored into the designation bit storage region of the setting data memory (SID) 103, thereby providing a data dropping function to the time-division switch. Also, address designation bits for cumulatively storing the thus dropped data into the external memory (MEM) 600 are stored into the designation bit storage region of the setting data memory (SID) 103.

It is to be noted that the setting data memory (SID) 103, head address memory (ADR) 104, end address memory (END) 106 and address counter memory (CNT) 105 have memory areas corresponding to respective addresses thereof.

The setting data memory (SID) 103 has a pattern wherein setting data are held as they are and another pattern wherein external memory address designation bits for serially reading out storage data of the external memory (MEM) 600 based on a result of address calculation of the address calculator (CAL) 500 to re-write and update data of a designated time slot.

Meanwhile, in the switch control memories (SC0) 400 and 401, designation bits are set so that data of the external memory (MEM) 600 may be selected with the external memory address designation bits.

Consequently, the time-division switch has a function of outputting stored contents of the external memory (MEM) 600 to a time slot of an arbitrary highway and allows transmission and reception of a multi-frame signal train mentioned hereinabove through the external memory (MEM) 600.

The control interface section (INF) 700 writes designation conditions mentioned hereinabove into the switch control memories (SC0) 400 and 401 from a control apparatus such as an external CPU.

The input/output path control section (ACOUNT) 800 controls addresses, data and input and output lines to the functional blocks which form the time-division switch. Further, the input/output path control section (ACOUNT) 800 controls an output selector (OUTSEL) 900 or 901 in accordance with designation bits stored in the switch control memory (SC0) 400 or 401 to insert data set in the setting data memory (SID) 103 into an arbitrary time slot in one of the n output highways 300 to 30n.

The external data storage memory (SD) 102 stores data written through the control interface section (INF) 700 or data read out from the external memory (MEM) 600 based on a result of address calculation of the address calculator (CAL) 500.

The setting data memory (SID) 103 has a pattern wherein setting data are held as they are as described hereinabove, and another pattern wherein designation bits which designate writing into the external memory (MEM) 600 from which a result of address calculation of the address calculator (CAL) 500 from the address counter memory (CNT) 105 is derived. The latter designation bit pattern provides a data dropping function wherein data dropped from the time slot memories (TSW) 100 and 101 are successiely stored into successively designated addresses of the external memory (MEM) 600.

As described hereinabove, in order to process a multi-frame signal, the setting data memory (SID) 103 has a region in which circulation designation data is stored so that a result of address calculation for designating a storage region of the external memory (MEM) 600 may have a circulation property. If such circulation designation data is stored in the just-mentioned region of the setting data memory (SID) 103, then circulating addresses are produced making use of the three address factors of the head address memory (ADR) 104, end address memory (END) 106 and address counter memory (CNT) 105.

Figure 2:
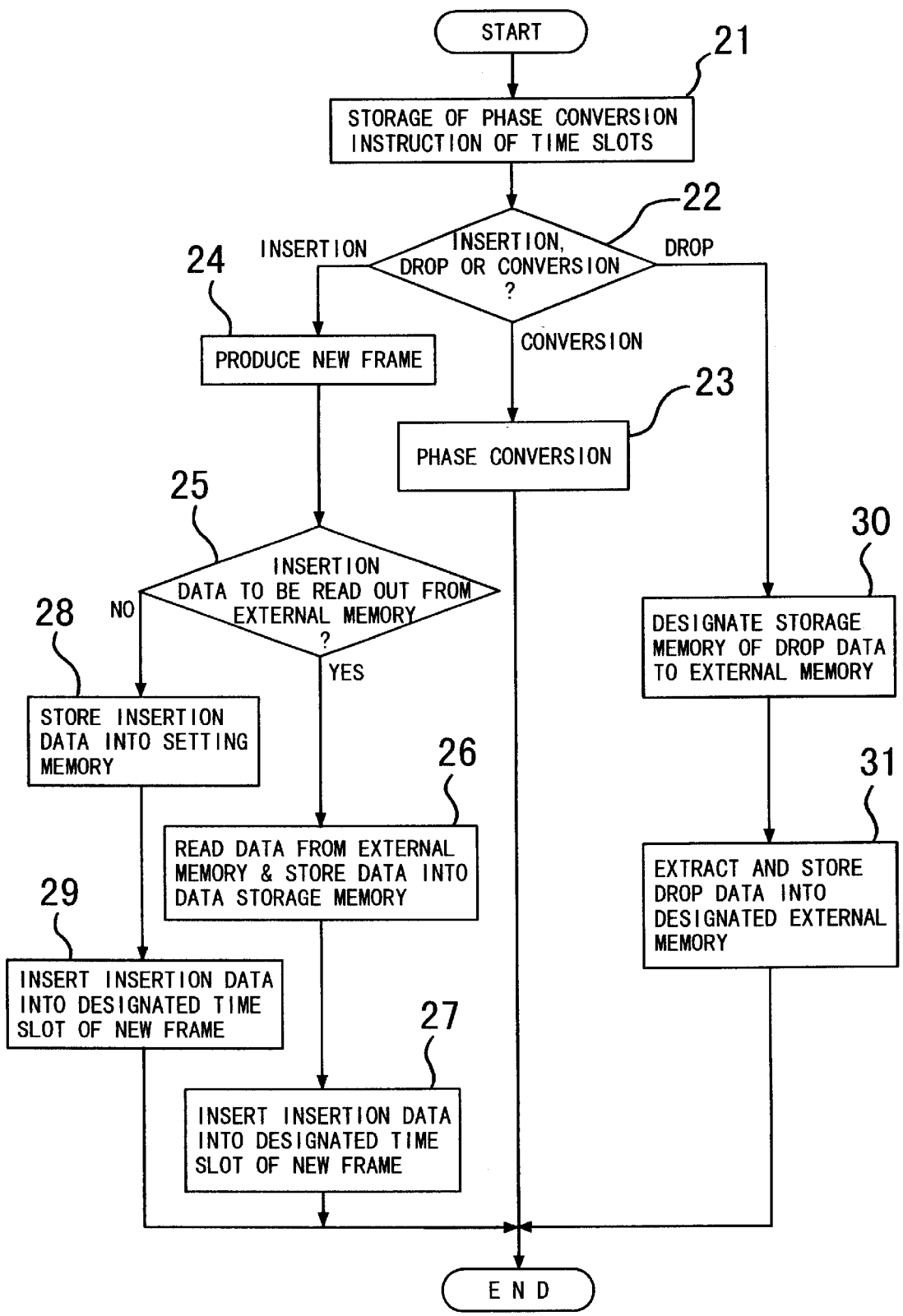
FIG. 2 is a flow chart illustrating a time-division switching method according to the present invention which is applied to the time-division switch of FIG. 1.

Now, operation of the time-division switch is described with reference to FIG. 2.

First, phase conversion arrays of time slots and drop and insertion designation bits are stored into the switch control memories (SC0) 400 and 401 (step 21). When time slots are stored into the time slot memories (TSW) 100 and 101, a central control system (CP) 1000 sequentially reads the switch control memories (SC0) 400 and 401 and discriminates whether mere phase conversion, insertion or drop should be performed (step 22). If only phase conversion is to be performed, the central control system (CP) 1000 phase converts data from the input side time slots into output side time slots in accordance with the designation bits of the switch control memories (SC0) 400 and 401.

When insertion should be performed, the central control system (CP) 1000 discriminates from the designation bits which one of the setting data pattern and the external memory data read pattern should be performed (step 25). If the external memory data read pattern should be performed, then the central control system (CP) 1000 reads out data from the external memory (MEM) 600 in accordance with the designation bits stored in the setting data memory (SID) 103 and stores the data into the external data storage memory (SD) 102 (step 26) and inserts the data into a new time slot.

On the other hand, if the setting data pattern should be performed (step 24), then the central control system (CP) 1000 additionally places a new frame (step 24). Then, the central control system (CP) 1000 reads out stored insertion data (step 28) from the setting data memory (SID) 103 and inserts the data into a time slot of the new frame.

When dropping should be performed (step 22), the central control system (CP) 1000 designates the storage destination of drop data in accordance with the designation bits of the setting data memory (SID) 103 (step 30) and stores the drop data into the designated address of the external memory (MEM) 600.

While a preferred embodiment of the present invention has been described using specific terms, such description is for illustrative purposes only, and it is to be understood that changes and variations may be made without departing from the spirit or scope of the following claims.

What is claimed is:

1. A time-division switching method for switchably connecting time slots of input and output highways to provide time-division multiplex communication, comprising:

receiving input time slot data associated with input time slots of said input highways and storing said input time slot data in an input time slot data memory;

designating associations among: (1) said input time slots, (2) output time slots of said output highways, and (3) locations in an external memory external to said input time slot data memory; and producing output time slot data for said output time slots in accordance with said input time slot data and said designated associations, wherein said producing comprises:

phase conversion, wherein input time slot data of an input time slot stored in said input time slot data memory is used as output time slot data of an associated output time slot;

insertion, wherein data stored in a location in said external memory is retrieved and used as output time slot data of an associated output time slot; and dropping of input time slot data, wherein input time slot data of an input time slot stored in the input time slot data memory is moved to an associated location in said external memory.

2. The method claimed in claim 1, wherein said insertion comprises one of:

updating insertion, wherein data stored in a location in said external memory is used as replacement data in an output time slot corresponding to an input time slot; and new insertion, wherein data is inserted in an output time slot data that is a new time slot not corresponding to any input time slot time.

3. The method claimed in claim 2, wherein said new time slot is a time slot of a data train comprised of a number of bits equal to an integral multiple of a number of bits encompassed by a time slot.

4. The method claimed in claim 2, wherein said dropping is performed on input time slot data corresponding to a given input time slot, and said updating insertion is performed on an output time slot corresponding to said given input time slot.

5. The method claimed in claim 1, wherein said providing further comprises fixed data insertion, wherein fixed data stored in a setting data memory separate from said input time slot data memory and said external memory is used as output time slot data of an associated output time slot.

6. The method claimed in claim 5, wherein said fixed data represents a tone signal.

7. The method claimed in claim 5, wherein said data used as output time slot data in said insertion comprises data stored in a location of said external memory represented by designation bits stored in said setting data memory.

8. A time division switch for switchably connecting time slots of input and output highways in time-division multiplex communication, comprising:

an input time slot data memory for temporarily storing input time slot data associated with input time slots of said input highways;

an external memory external to said input time slot data memory;

designating means for designating associations among:(1) said input time slots, (2) output time slots of said output highways, and (3) locations in an external memory external to said input time slot data memory; and switch control means for producing output time slot data for said output time slots in accordance with said input time slot data and said designated associations, wherein said producing comprises:

phase conversion, wherein input time slot data of an input time slot stored in said input time slot data memory is used as output time slot data of an associated output time slot;

insertion, wherein data stored in a location in said external memory is retrieved and used as output time slot data of an associated output time slot; and dropping of input time slot data, wherein input time slot data of an input time slot stored in the input time slot data memory is moved to an associated location in said external memory.

9. The apparatus claimed in claim 8, further comprising:

a setting data memory separate from said input time slot data memory and said external memory, the setting data memory storing fixed data and designation bits corresponding to storage locations of said external memory; and an address calculator for calculating an addresses of a storage location in said external memory using said designation bits.

10. The apparatus claimed in claim 9, wherein said fixed data represents a tone signal.

* * * * *